(12) United States Patent
Hsu

(10) Patent No.: US 7,774,586 B2
(45) Date of Patent: Aug. 10, 2010

(54) SYSTEM AND METHOD FOR EXPRESS EXECUTION OF PLAYING COMPUTER MULTIMEDIA DATA

(75) Inventor: Sheng-Kai Hsu, Luodong Township, Yilan County (TW)

(73) Assignee: Getac Technology Corporation, Hsinchu (TW)

( * ) Notice: Subject to any disclaimer, the term of this patent is extended or adjusted under 35 U.S.C. 154(b) by 977 days.

(21) Appl. No.: 11/230,657

(22) Filed: Sep. 21, 2005

(65) Prior Publication Data

US 2007/0018991 A1 Jan. 25, 2007

(30) Foreign Application Priority Data

Jul. 22, 2005 (TW) .............. 94125020 A

(51) Int. Cl.
G06F 9/00 (2006.01)
G06F 9/24 (2006.01)
(52) U.S. Cl. .............. 713/1; 713/2; 713/100; 702/150; 715/700; 715/739; 715/961
(58) Field of Classification Search .......... 713/1, 713/2, 100; 702/150; 715/700, 739, 961
See application file for complete search history.

(56) References Cited

U.S. PATENT DOCUMENTS

| | | | | |
|---|---|---|---|---|
| 4,799,145 | A * | 1/1989 | Goss et al. | 713/1 |
| 7,076,644 | B2 | 7/2006 | Hsu | |
| 7,228,408 | B2 * | 6/2007 | Wu et al. | 713/1 |
| 7,475,233 | B2 * | 1/2009 | Rothman et al. | 713/1 |
| 2004/0006690 | A1 * | 1/2004 | Du et al. | 713/2 |
| 2005/0055545 | A1 * | 3/2005 | Guo et al. | 713/1 |
| 2005/0062636 | A1 * | 3/2005 | Conway et al. | 341/176 |
| 2005/0114717 | A1 | 5/2005 | Chen | |
| 2005/0125193 | A1 * | 6/2005 | Kling et al. | 702/150 |
| 2006/0064571 | A1 * | 3/2006 | Tseng | 713/1 |

FOREIGN PATENT DOCUMENTS

| | | |
|---|---|---|
| DE | 10331546 A1 | 5/2004 |
| JP | 06-208525 | 7/1994 |
| JP | 2000-020285 | 1/2000 |
| TW | 504641 | 10/2002 |

OTHER PUBLICATIONS

"Via is willing to walk into your parlor," printed from the internet on Mar. 2, 2006—http://www.heise.de/newsticker/meldung/print/31378.

* cited by examiner

*Primary Examiner*—Thomas Lee
*Assistant Examiner*—Michael J Brown
(74) *Attorney, Agent, or Firm*—Quintero Law Office, PC

(57) ABSTRACT

A method and system for express execution of multimedia playing is provided. A computer system is installed with a first operating system and a second operating system in a data storage therein. The method includes the following steps: the computer system finishing basic booting process; the computer system loading and executing a driver to activate a touch-control display device; the touch-control display device displaying icons representing detected audiovisual players; detecting the icon selection by the user; based on the selection, loading and executing the corresponding operating system; and executing the application program corresponding to the selected audiovisual player.

9 Claims, 4 Drawing Sheets

SYSTEM AND METHOD FOR EXPRESS EXECUTION OF PLAYING COMPUTER MULTIMEDIA DATA

FIELD OF THE INVENTION

The present invention relates to a method for playing computer multimedia and, more particularly, to a method for express execution of playing computer multimedia with a touch-control interface.

BACKGROUND OF THE INVENTION

The multimedia playing system made with the integration of a computer system and an audiovisual player is gaining popularity and is widely used on many occasions, including offices and households, because the rapid development of computer technology.

The design of the conventional multimedia playing systems is basically interfacing a computer system with an audiovisual player. With this type of design, the user usually needs to boot the computer system up in order to activate and operate the audiovisual player. In other words, the user must wait until the computer system completes the BIOS program initialization, POST program, peripheral detection and driving, OS activation, system state setting, and so on, before the user can execute the audiovisual program to play the audiovisual data. It is inconvenient for the user as there is no shortcut to bypass the tedious booting process of the computer system.

To overcome the aforementioned drawback, the current technology utilizes different designs to implement express execution of multimedia playing. These designs configure a different region in the hard-disk and install a first operating system, such as Linux-based OS, and a second operation system, such as a Windows OS, in different hard-disk regions. These designs require modification to the computer BIOS. The user can select the execution of PC mode or the AV mode. When the user selects the AV mode, the computer system does not execute the usual booting process when the computer is turned on. Instead, the computer system loads and executes a first operating system in the first hard-disk region, and drives the audiovisual player. That is, the user does not enter the Windows OS; therefore, the time waiting for the system to finish the initialization of the hardware is saved.

However, the current implementations still requires the user to memorize the operation instruction and follow strictly in order to select between the PC mode and the AV mode. This lack of ease of use is still in convenient for the user.

Although some designs display operation instructions on the monitor to guide the user, this display of instruction usually takes place after the computer systems enters the operating system mode; therefore, it does not meet the demands of express execution of playing multimedia data.

Furthermore, as most designs require the user to enter their selections through keyboard or mouse, which are only activated after the computer system enters the operating system mode, it is still inconvenient for the user.

SUMMARY OF THE INVENTION

The present invention is provided to overcome the aforementioned drawbacks of the conventional methods of express execution of multimedia. The primary objective of the present invention is to provide a method for multimedia playing with a touch-control input mode. After the computer finishes the basic booting process, the computer loads and executes a driver to activate a touch-control display device. The touch-control display device displays icons of the detected audiovisual players. The user is only required to select the icon of the corresponding audiovisual player to execute the multimedia playing.

Another objective of the present invention is to provide a method for multimedia playing with a highly user-friendly interface. The touch-control display device used in the present invention provides the icon for the selection as well as displays operation instruction or related information to the user.

Yet another objective of the present invention is to provide a method for express execution of multimedia playing. Without activating the regular operating system, the present invention allows the user to select and activate the multimedia playing. The user is saved from the waiting of the operating system to initialize all the hardware before executing the multimedia playing.

Another objective of the present invention is to provide a method for express execution of multimedia playing with ease of use. The computer, after completing BIOS initialization and POST program, activates a touch-control display device to display the selection icon for the user to determine whether a regular computer operating environment or a multimedia player is needed. The computer, based on the selection, determines which operation system will be executed.

To achieve the aforementioned objectives, the present invention provides a method comprising the following steps: the computer system finishing basic booting process; the computer system loading and executing a driver to activate a touch-control display device; the touch-control display device displaying icons representing detected audiovisual players; detecting the icon selection by the user; based on the selection, loading and executing the corresponding operating system; and executing the application program corresponding to the selected audiovisual player.

In the preferred embodiments of the present invention, a data storage is used to store a first operating system and a second operating system. The data storage also stores a driver for a touch-control display device, drivers for audiovisual players, and playing application programs for driving the audiovisual players. The touch-control display device displays, after the computer finishes basic booting process and BIOS, the icons representing the audiovisual players connected to the computer system as well as options for activating the second operation system.

In comparison with the conventional methods, the present invention allows the user to select the icon to execute the corresponding playing application program of the audiovisual player without memorizing the complicated operation instructions or use keyboard or mouse for the input. Therefore, the present invention provides a user-friendly interface for convenient use of the multimedia computer system. In addition, the computer system of the present invention activates touch-control display device after the BIOS and POST process, and waits for the user to enter their selection. Therefore, the user can directly execute the multimedia playing program without waiting for entering the regular operating system environment of a computer system.

These and other objective, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
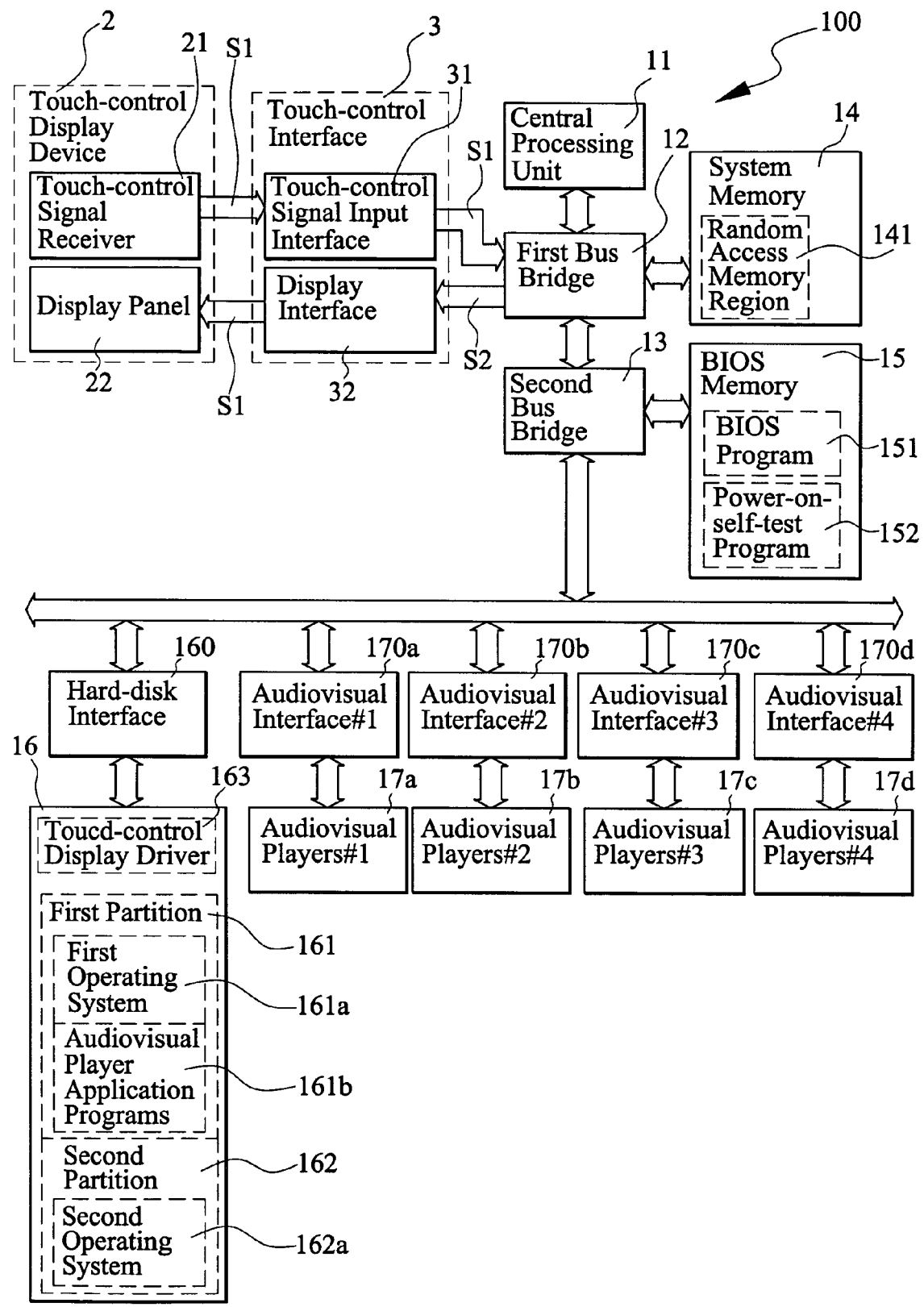
FIG. 1 shows a functional block diagram of the present invention.

With reference to the drawings and in particular to FIG. 1, which shows a functional block diagram of the present invention, a computer 100 comprises a central processing unit 11, a first bus bridge 12, and a second bus bridge 13. The central processing unit 11 is connected to the first bus bridge 12 through a system bus. The first bus bridge 12 is connected to a system memory 14.

The second bus bridge 13 is connected to a BIOS memory 15. The BIOS memory 15 stores an BIOS program 151 and a power-on-self-test (POST) program 152, required by the computer 100 during the booting.

The second bus bridge 13 is connected to a hard-disk interface 160 through a bus. The hard-disk interface 160 is connected to a hard-disk 16. The hard-disk 16 served as a data storage is for storing data in the present invention. The hard-disk 16 is configured to comprise a first partition 161 and a second partition 162. The first partition 161 is installed with a first operating system 161a, such as Linux-based operating system, Tiny Windows-based operating system, or embedded operating system. The first partition 161 also stores various audiovisual player application programs 161b and other application programs working under the first operating system environment. The second partition 162 is installed with a second operating system 162a, such as Windows-operating system and other application programs working under the second operating system environment.

The second bus bridge 13 is connected to a plurality of audiovisual players 17a, 17b, 17c, 17d through audiovisual interfaces 170a, 170b, 170c, 170d. The audiovisual interfaces 170a, 170b, 170c, 170d can adopt conventional standard interface to connect the audiovisual players 17a, 17b, 17c, 17d to the second bus bridge 13 so that the computer 100 can control the playing function of the audiovisual players 17a, 17b, 17c, 17d. The audiovisual players 17a, 17b, 17c, 17d can be a DVD, MP3, CD, or TV.

The present invention also comprises a touch-control display device 2, connected to the computer 100 through a touch-control interface 3. The hard-disk 16 of the computer 100 stores a touch-control display driver 163 for driving the touch-control display device 2. The touch-control display driver 163 can also be built-in inside the BIOS memory 15. The touch-control display device 2 can receives instructions input from control-touch panel, and displays information of the computer system.

In the preferred embodiment of the present invention, the touch-control interface 3 is a high speed display bus interface, such as known AGP display bus interface, connected to the first bus bridge 12 or a PCI bus interface connected to the second bus bridge 13.

The touch-control display device 2 comprises a touch-control signal receiver 21 and a display panel 22, connected to the first bus bridge 12 of the computer 100 through a touch-control signal input interface 31 and a display interface 32, respectively. When the touch-control signal receiver 21 is touched, a signal s1 is sent to the computer 100. Similarly, a visual signal s2 generated by the computer 100 can be displayed on the display panel 22 of the touch-control display device 2.

Figure 2:
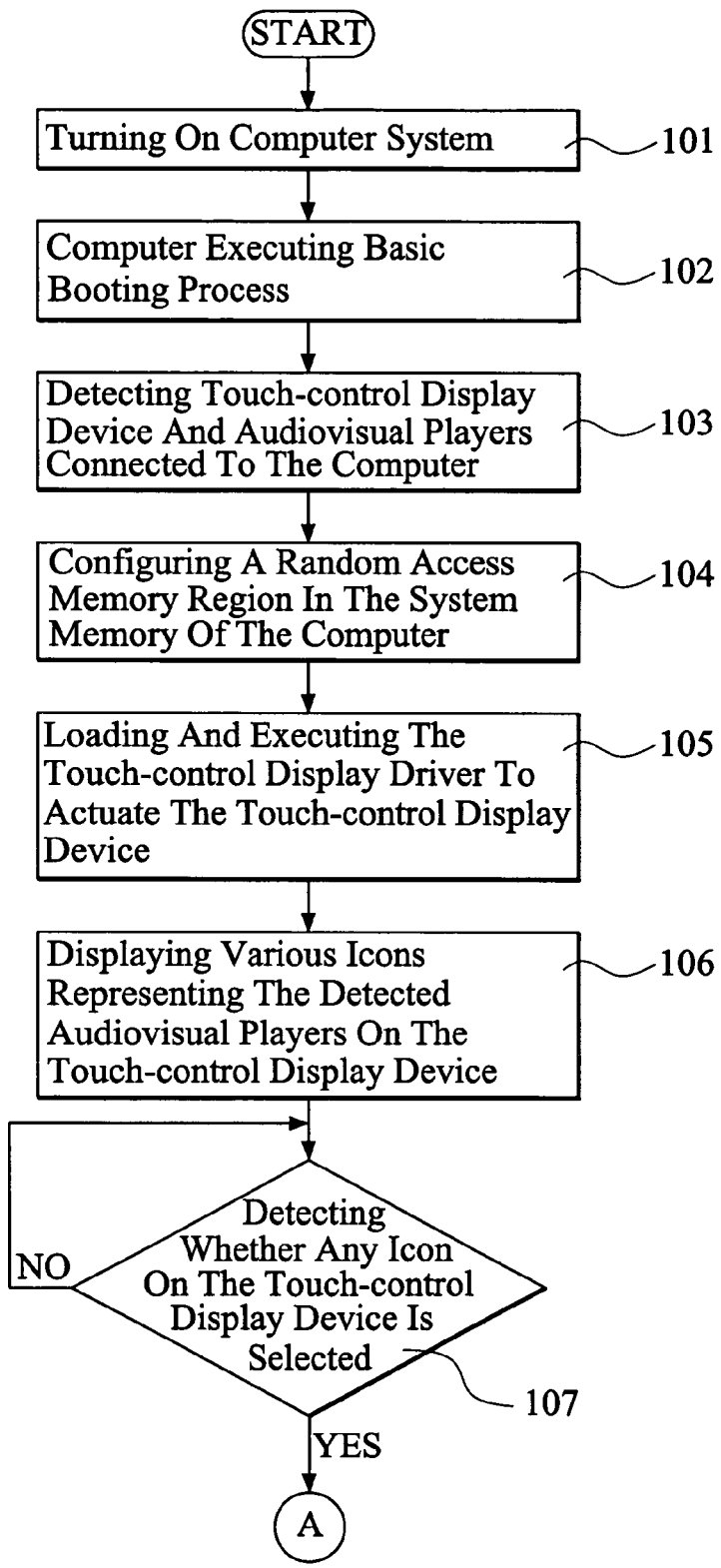
FIG. 2 shows part I of a control flowchart of the present invention.
Figure 3:
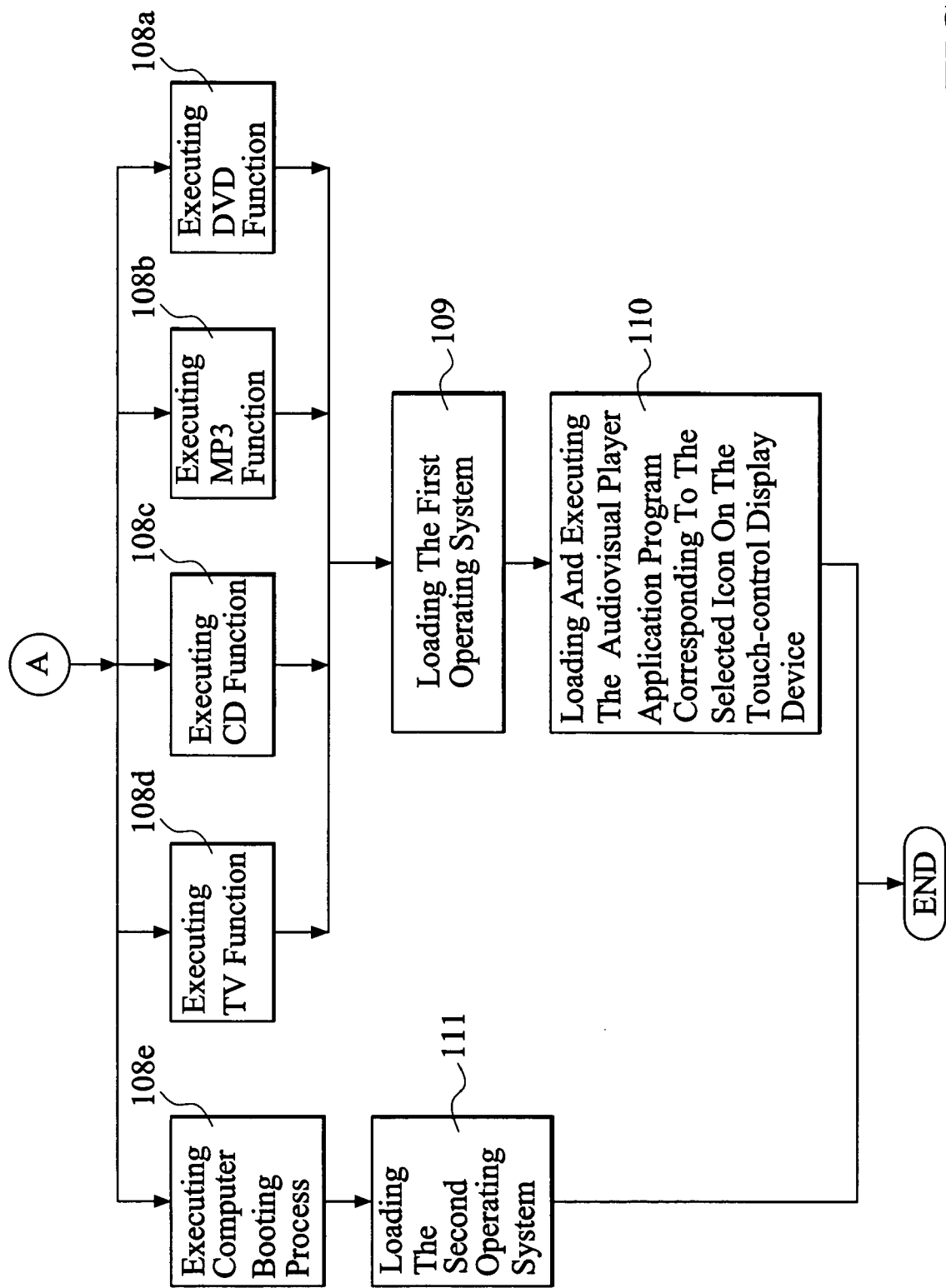
FIG. 3 shows part II of a control flowchart of the present invention.

FIG. 2 and FIG. 3 show the flowchart of the present invention. The following description refers to FIGS. 1, 2, and 3.

In step 101, the computer 100 is turned on. In step 102, the computer 100 executes basic booting process. That is, the computer 100 loads and executes the BIOS program 151 and the POST program 152 from the BIOS memory 15. Step 103 is for the BIOS program 161 to detect the touch-control display device 2 and the audiovisual players 17a, 17b, 17c, 17d connected to the computer 100. The audiovisual players 17a, 17b, 17c, 17d can be DVD player, MP3 player, CD player, TV, and so on.

Step 104 is to configure a random access memory region 141 in the system memory 14 of the computer 100 for the space required for executing the operating system, the touch-control display driver, the audiovisual player driver, and the audiovisual player application program. Step 105 is for the BIOS program 151 to load and execute the touch-control display driver 163 from the hard-disk 16 so that the touch-control display device 2 can start to operate.

Step 106 is for the touch-control display device 2 to display a plurality of icons representing the detected audiovisual players connected to the computer 100. Step 107 is for detecting whether any icon on the touch-control display device 2 is selected, i.e., touched. When a selection is detected, the present invention determines which icon is selected.

Figure 4:
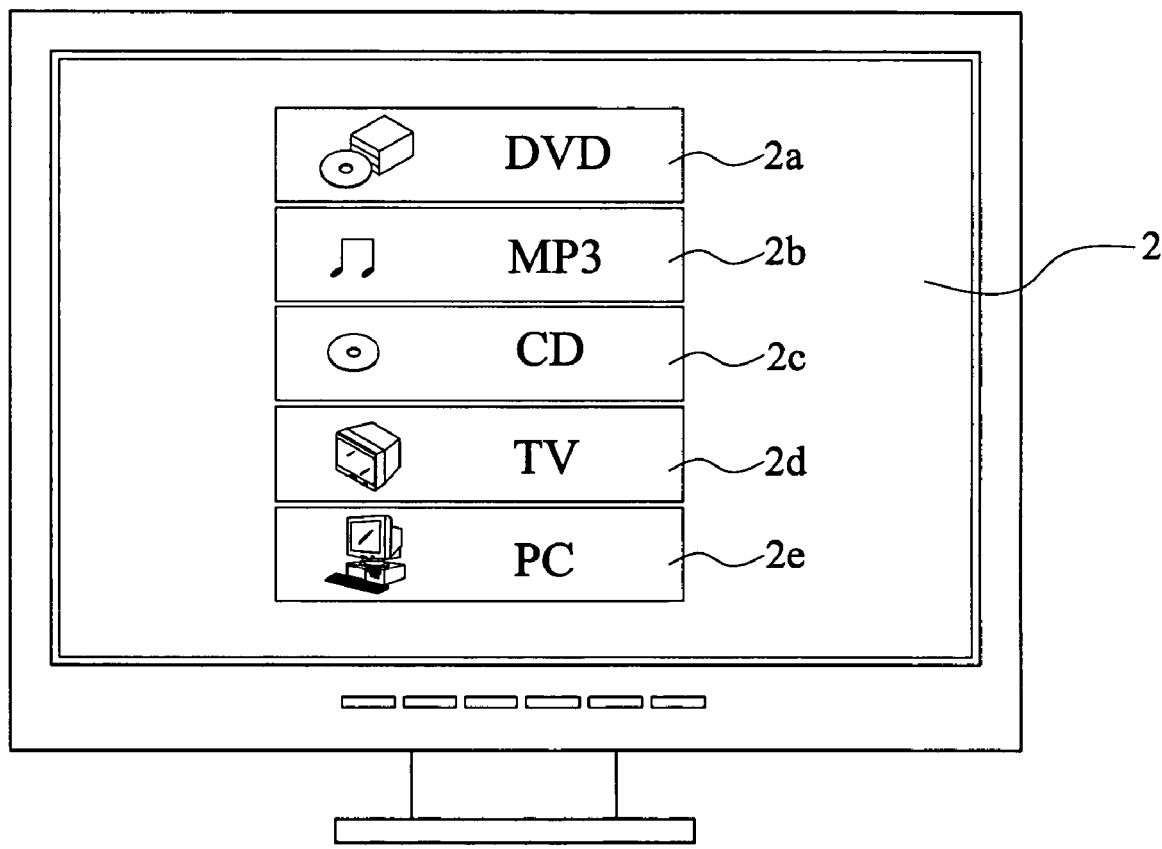
FIG. 4 shows a schematic view of a plurality of icons displayed on touch-control display device of the present invention.

FIG. 4 shows various icons are shown on the touch-control display device in accordance with an embodiment of the present invention. The touch-control display device 2 displays DVD player icon 2a, MP3 player icon 2b, CD player icon 2c, and TV icon 2d. When the user touches DVD player icon 2a, MP3 player icon 2b, CD player icon 2c, or TV icon 2d, the corresponding step will be executed to play the application program, such as step 108a to play DVD, step 108b to play MP3, step 108c to play CD, or step 108d to play TV, as shown in FIG. 3.

When the selection is detected and determined, the computer 100 loads the first operating system 161a in the first partition 161 of the hard-disk 16, as in step 109. The first operating system 161a is a simplified operating system, which only provides basic operating environment and activates audiovisual player application programs.

Step 110 is to load and execute the audiovisual player application program 162b corresponding to the selected icon on the touch-control display device 2 from the hard-disk 16. To this point, the method of the present invention allows the user to quickly activate the audiovisual player application programs without waiting for the tedious booting process of a regular operating system.

The touch-control display device 2 can also display an icon 2e for the option of a complete computer system booting process, as shown in FIG. 4. When this icon is selected, the present invention enters the complete booting process, as in step 108e. Step 111 is to load and execute a second operating system 162a from the second partition 162 of the hard-disk 16 of the computer 100.

The aforementioned embodiment shows that the present invention provides a method for express execution of multimedia playing with a user-friendly interface which is easy to operate. The present invention also shortens the waiting period of a regular booting process in conventional multimedia computer system.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for express execution of multimedia playing with a touch-control interface for a computer system, the computer system having a data storage, a system memory, a BIOS, a touch-control display device and at least an audiovisual player, the data storage storing an operating system, a touch-control display device driver, audiovisual player drivers, and audiovisual player application programs, the method comprising the steps of:
   (a) turning on the computer system;
   (b) executing the BIOS of the computer system;
   (c) before loading and executing the operating system, performing the steps of:
      (c1) detecting the touch-control display device and audiovisual players connected to the computer system;
      (c2) loading and executing the touch-control display device driver to start the detected touch-control display device;
      (c3) the touch-control display device displaying icons representing the detected audiovisual players connected to the computer system;
      (c4) detecting whether a selection is made by touching the icon displayed on the touch-control display device;
   (d) loading and executing the operating system from the data storage when the icon representing the audiovisual player is touched; and
   (e) executing the audiovisual player application program corresponding to the touched icon.

2. The method as claimed in claim 1, wherein step (c2) further comprises a step of configuring a random access memory region in the system memory of the computer system to provide a space required for the execution of the operating system, the touch-control display driver, the audiovisual player driver, and audiovisual player application programs.

3. A method for express execution of multimedia playing with a touch-control interface for a computer system, the computer system having a data storage, a system memory, a BIOS, a touch-control display device and at least an audiovisual player, the data storage storing a first operating system and a second operating system, a touch-control display device driver, audiovisual player drivers, and audiovisual player application programs, the method comprising the steps of:
   (a) turning on the computer;
   (b) executing the BIOS of the computer system;
   (c) before loading and executing either the first or second operating system, performing the steps of:
      (c1) detecting the touch-control display device and audiovisual players connected to the computer system;
      (c2) loading and executing the touch-control display device driver to start the detected touch-control display device;
      (c3) the touch-control display device displaying icons representing the detected audiovisual players connected to the computer system and an icon representing booting the second operating system;
      (c4) detecting whether a selection is made by touching the icon representing the audiovisual player displayed on the touch-control display device;
   (d) loading and executing the first operating system from the data storage when the icon representing the audiovisual player is touched; and
   (e) executing the audiovisual player application program corresponding to the touched.

4. The method as claimed in claim 3, wherein the first operating system and the second operating system are stored in a first partition and a second partition of the data storage respectively.

5. The method as claimed in claim 3, wherein step (c2) further comprises a step of configuring a random access memory region in the system memory of the computer system to provide space required for the execution of the first operating system, the touch-control display driver, the audiovisual player driver, and audiovisual player application programs.

6. A multimedia computer system, comprising:
   a computer system, comprising a system memory and a BIOS;
   a touch-control display device, comprising a touch-control signal receiver and a display panel, connected to the computer through a touch-control signal interface and a display interface, respectively, where the touch-control signal receiver sends a signal to the computer system when touched, and visual signals generated by the computer system are sent to the display panel of the touch-control display device for displaying;
   at least an audiovisual player, connected to the computer system through an audiovisual interface; and
   a data storage, storing a first operating system and a second operating system, a touch-control display device driver, audiovisual player drivers, and audiovisual player application programs;
   where the display panel of the touch-control display device is configured to display icons representing the audiovisual players connected to the computer system and detect a selection made by touching the icon representing the audiovisual player displayed on the touch-control display device before loading and executing either the first or second operating system, and wherein the first operating system is loaded from the data storage and executed when the icon representing the audio visual player is touched, and the audiovisual player application program corresponding to the touched icon is executed.

7. The system as claimed in claim 6, wherein the first operating system and the second operating system are stored in a first partition and a second partition of the data storage respectively.

8. The system as claimed in claim 6, wherein a random access memory region is configured in the system memory of the computer system to provide a space required for the execution of the operating system, the touch-control display driver, the audiovisual player driver, and audiovisual player application program.

9. The system as claimed in claim 6, wherein the touch-control display device further displays an icon representing an option of the booting process of the second operating system of the computer.

* * * * *